(12) United States Patent
Knight et al.

(10) Patent No.: US 7,368,725 B2
(45) Date of Patent: May 6, 2008

(54) OPTICAL RADIATION SENSOR SYSTEM HAVING A RADIATION WINDOW WITH A NON-CIRCULAR OPENING

(75) Inventors: D. Gordon Knight, London (CA); Alex M. W. Verdun, London (CA); Catalina M. Dragoi, London (CA)

(73) Assignee: Trojan Technologies Inc. (CA)

( * ) Notice: Subject to any disclaimer, the term of this patent is extended or adjusted under 35 U.S.C. 154(b) by 2 days.

(21) Appl. No.: 10/998,168

(22) Filed: Nov. 29, 2004

(65) Prior Publication Data

US 2005/0127277 A1 Jun. 16, 2005

Related U.S. Application Data

(60) Provisional application No. 60/525,839, filed on Dec. 1, 2003.

(51) Int. Cl.
*G01N 21/01* (2006.01)
(52) U.S. Cl. .................. 250/372; 250/353; 250/239
(58) Field of Classification Search ............... 250/373, 250/372, 214 R, 221
See application file for complete search history.

(56) References Cited

U.S. PATENT DOCUMENTS 4,207,892 A * 6/1980 Binder ................. 600/476
4,447,726 A    5/1984 Mudge et al.
4,703,171 A * 10/1987 Kahl ..................... 250/221
5,142,138 A * 8/1992 Yonezawa .............. 250/208.1
5,514,871 A    5/1996 Hayes et al.
6,269,680 B1 * 8/2001 Prieve ................... 73/23.21
6,348,691 B1    2/2002 Sandell et al.
6,404,342 B1 * 6/2002 Planer ................... 340/577
6,512,234 B1 * 1/2003 Sasges ................... 250/373
6,518,577 B1    2/2003 Fang et al.
6,541,777 B1 * 4/2003 Lombardo .............. 250/435

* cited by examiner

*Primary Examiner*—Georgia Epps
*Assistant Examiner*—Tony Ko
(74) *Attorney, Agent, or Firm*—Katten Muchin Rosenman LLP

(57) ABSTRACT

There is described an optical radiation sensor device for detecting radiation in a radiation field. The device comprises a sensor element capable of detecting and responding to incident radiation from the radiation field and a radiation window interposed between the sensor element and the radiation field. The radiation window comprises a non-circular (preferably square) shaped radiation transparent opening. The optical radiation sensor device can be used in a so-called dynamic manner while mitigating or obviating the detection errors resulting from the use of a circular-shaped attenuating aperture and/or angular (even minor) misalignment of the sensor device with respect to the array of radiation sources when multiple such circular-shaped attenuating apertures are used.

39 Claims, 5 Drawing Sheets

Response of Optical Radiation Sensor Device With Circular-Shaped Attenuating Aperture (0.075 inches and 0.125 inches) to UV Light of Constant Intensity as a Function o Sensor Angle to UV Lamp Illustration of a UV Lamp Within the Field of View of a Sensor With Round and Square Apertures Top View of Sensor with Apertures Relative to UV Lamp Response of Optical Sensor Device With Square-Shaped Attenuating Apertures (0.075 in x0.075 in and 0.125 in x 0.125 in) to UV Light of Constant Intensity as a Function of Sensor Angle to UV Lamp Response of Optical Sensor Device With Square-Shaped Attenuating Apertures (0.090 in x0.090 in and 0.150 in x 0.150 in) to UV Light of Constant Intensity as a Function of Sensor Angle to UV Lamp

OPTICAL RADIATION SENSOR SYSTEM HAVING A RADIATION WINDOW WITH A NON-CIRCULAR OPENING

CROSS-REFERENCE TO RELATED APPLICATION

The present application claims the benefit under 35 U.S.C. §119(e) of provisional patent application Ser. No. 60/525,839, filed Dec. 1, 2003, the contents of which are hereby incorporated by reference.

BACKGROUND OF THE INVENTION

1. Field of the Invention

Generally, the present invention relates to an optical radiation sensor system.

2. Description of the Prior Art

Optical radiation sensors are known and find widespread use in a number of applications. One of the principal applications of optical radiation sensors is in the field of ultraviolet radiation fluid disinfection systems.

It is known that the irradiation of water with ultraviolet light will disinfect the water by inactivation of microorganisms in the water, provided the irradiance and exposure duration are above a minimum "dose" level (often measured in units of microwatt seconds per square centimetre). Ultraviolet water disinfection units such as those commercially available from Trojan Technologies Inc. under the tradenames Trojan UV Max™ and Trojan UV Swift™, employ this principle to disinfect water for human consumption. Generally, water to be disinfected passes through a pressurized stainless steel cylinder which is flooded with ultraviolet radiation. Large scale municipal waste water treatment equipment such as that commercially available from Trojan Technologies Inc. under the trade-names UV3000™ and UV4000™, employ the same principle to disinfect waste water. Generally, the practical applications of these treatment systems relates to submersion of a treatment module or system in an open channel wherein the wastewater is exposed to radiation as it flows past the lamps. For further discussion of fluid disinfection systems employing ultraviolet radiation, see any one of the following:

U.S. Pat. No. 4,482,809,
U.S. Pat. No. 4,872,980,
U.S. Pat. No. 5,006,244,
U.S. Pat. No. 5,418,370,
U.S. Pat. No. 5,471,063,
U.S. Pat. No. 5,504,335,
U.S. Pat. No. 5,539,210, and
U.S. Pat. No. 5,590,390 (Re.36,896).

In many applications, it is desirable to monitor the level of ultraviolet radiation present within the water under treatment. In this way, it is possible to assess, on a continuous or semi-continuous basis, the level of ultraviolet radiation, and thus the overall effectiveness and efficiency of the disinfection or treatment process. The information so-obtained may be used to control lamp output to a desired level and/or determined when it would be desirable to clean the exterior of the protective sleeves typically used to contain the radiation lamp(s).

It is known in the art to monitor the ultraviolet radiation level by deploying one or more sensor devices near the operating lamps in specific locations and orientations which are remote from the operating lamps. These sensor devices may be photodiodes, photoresistors or other devices that respond to the impingement of the particular radiation wavelength or range of radiation wavelengths of interest by producing a repeatable signal level (e.g., in volts or amperes) on output leads.

Conventional optical radiation sensors, by design or orientation, normally sense the output of only one lamp, typically one lamp which is adjacent to the sensor. If it is desirable to sense the radiation output of a number of lamps, it is possible to use an optical radiation sensor for each lamp. A problem with this approach is that the use of multiple sensors introduces uncertainties since there can be no assurance that the sensors are identical in their response. Specifically, vagaries in sensor materials can lead to vagaries in the signals which are sent by the sensors leading to a potential for false information being conveyed to the user of the system.

U.S. Pat. No. 6,512,234 [Sasges et al. (Sasges)] teaches an optical radiation sensor system which allows determination of lamp output information for a single lamp in an array of lamps. An advantage of the Sasges system is that a single sensor device can be moved with respect to the radiation field to allow determination of the dose delivered to the fluid (i.e., in place of the multiple sensors conventionally required as discussed above). More specifically, the optical radiation sensor taught by Sasges allows for on-line determination of ultraviolet (UV) transmittance of the fluid being treated in a UV radiation lamp array.

While optical radiation sensor taught by Sasges is a significant advance in the art, there is room for improvement. Specifically, the field of view of conventional sensor devices (e.g., photodiodes, photoresistors, etc.) is relatively large thereby making it possible for the sensor device to detect in a simultaneous manner the output of more than one lamp. This can be problematic if the object is to determine lamp output information for a single radiation source (e.g., elongate lamp) in an array of radiation sources (e.g., elongate lamps).

One solution to this problem is to restrict the field of view of the sensor device so that the sensor device can "see" only one lamp at any particular point in time. Restricting the field of view of the sensor device to one particular lamp can be accomplished by interposing an appropriately sized circular-shaped aperture between the sensor device and the array of radiation sources (e.g., elongate lamps). As will be described in more detail below, interposition of a circular-shaped attenuating aperture between a sensor device and an array of radiation sources (e.g., elongate lamps) can create a further problem. Specifically, as the particular radiation source (e.g., elongate lamp) and circular-shaped attenuating aperture are moved with respect to one another (typically, the latter will be moved with respect to the former), the area of the lamp "seen" by the sensor device changes. This change in area results in unwanted changes to the radiation intensity detected by the sensor device.

Further, restriction of the field of view of the sensor device so that the sensor device can only "see" one particular radiation source (e.g., elongate lamp) may be accomplished by interposing multiple decreasingly-sized, circular-shaped attenuating apertures between the sensor device and the array of radiation sources (e.g., elongate lamps). The use of such multiple apertures in this manner can result in the intensity of the radiation detected by the sensor device varying sharply as a function of the angular position of the sensor. In the result, any angular (even minor) misalignment of the sensor device with respect to the array of radiation sources will result in an unwanted significant change in detected intensity.

These problems can cause significant errors in detection of radiation intensity from the array of lamps, thereby undermining the reliability of the radiation sensor system.

Accordingly, it would be desirable to have a radiation sensor system which could be used in a dynamic application such as the Sasges sensor system referred to above while obviating or mitigating the detection errors referred to above resulting from the use of a circular-shaped attenuating aperture and/or angular (even minor) misalignment of the sensor device with respect to the array of radiation sources when multiple such circular-shaped attenuating apertures are utilized.

SUMMARY OF THE INVENTION

It is an object of the present invention to provide a novel optical radiation sensor device which obviates or mitigates at least one of the above-mentioned disadvantages of the prior art.

Accordingly, in one of its aspects, the present invention provides an optical radiation sensor device for detecting radiation in a radiation field, the device comprising a sensor element capable of detecting and responding to incident radiation from the radiation field and a radiation window interposed between the sensor element and the radiation field, the radiation window comprising a non-circular shaped radiation transparent opening.

In one of its aspects, the present invention provides an optical radiation sensor device for detecting radiation in a radiation field comprising an elongate radiation source having a longitudinal axis, the device comprising a sensor element capable of detecting and responding to incident radiation from the radiation field and a radiation window interposed between the sensor element and the radiation field, the radiation window comprising a radiation transparent opening having a shape such that, upon relative movement (e.g., rotational or non-rotational) between the radiation source and the radiation transparent opening in a direction substantially transverse to the longitudinal axis from a first position to a second position, a first area of the lamp as a function of a second area of the window is substantially unchanged in the first position and the second position.

Thus, the present inventors have discovered a novel optical radiation sensor device which can be used in a so-called dynamic manner such as in the Sasges sensor system described above while mitigating or obviating the detection errors referred to above resulting from the use of a circular-shaped attenuating aperture and/or angular (even minor) misalignment of the sensor device with respect to the array of radiation sources when multiple such circular-shaped attenuating apertures are used. Specifically, in the present radiation, a radiation window is interposed between the sensor element and the radiation field. The radiation window is of a design such that the area of the radiation source (e.g., elongate lamp) "seen" by the radiation sensor device remains substantially unchanged as the radiation window is swept (e.g., rotationally or non-rotationally) by the radiation source (e.g., elongate lamp) in a dynamic sensor system such as the one taught by Sasges referred to above. In one preferred embodiment, the radiation window comprises a non-circular (e.g., square, rectangular, etc.) shaped radiation transparent opening.

The use of a radiation window in the present optical radiation device results in detection of a substantially constant signal by the sensor device while the entire width of the radiation source (e.g., elongate lamp) is within the field of view of the sensor. A further advantage of the present optical radiation sensor is that any variation of the signal due to a change in angle between the sensor device and the radiation source (e.g., elongate lamp) will be in the form of the so-called "cosine response" (discussed below) for which compensation can be readily implemented.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Prior to describing the preferred embodiments of the present invention, a brief description will be presented concerning the prior art approach referred to above.

Figure 1A:
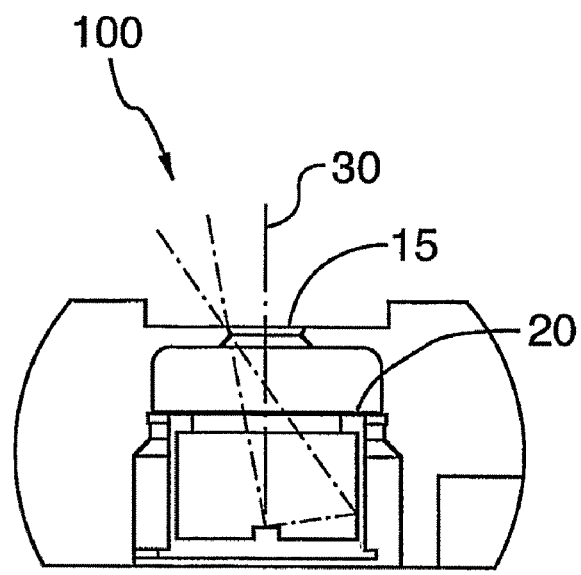
FIGS. 1a and 1b illustrate a schematic view of a prior art optical radiation sensor device.
Figure 1B:
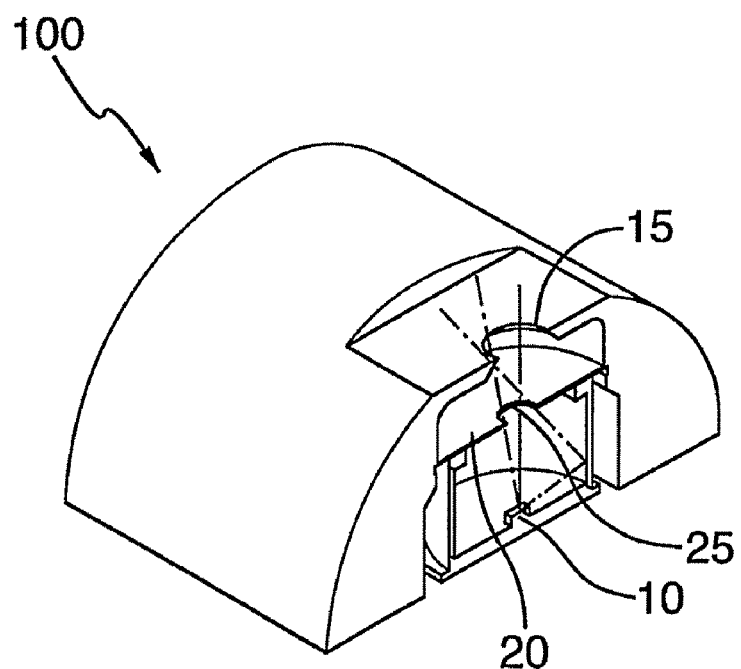

Thus, with reference to FIGS. 1a and 1b, there is illustrated an optical radiation sensor device 100 comprising a radiation sensor element 10 disposed at a proximal end thereof and a first radiation transparent window 15 disposed at a distal end thereof. Interposed between radiation transparent window 15 and sensing element 10 is an attenuating disk 20 provided with an aperture 25. Of note, window 15 and aperture 25 are both circular in shape with the former having a larger diameter than the latter.

In this embodiment, window 15 serves as a so-called second aperture and aperture 25 serves as a so-called first aperture. The specific diameters and relative displacement of these two apertures in sensor device 100 is such that there is achieved a field of view of ±10.5° relative to the concentric axis through the first aperture and the second aperture. This facilitates keeping one radiation source in view when the radiation source is located along the concentric axis.

Figure 2:
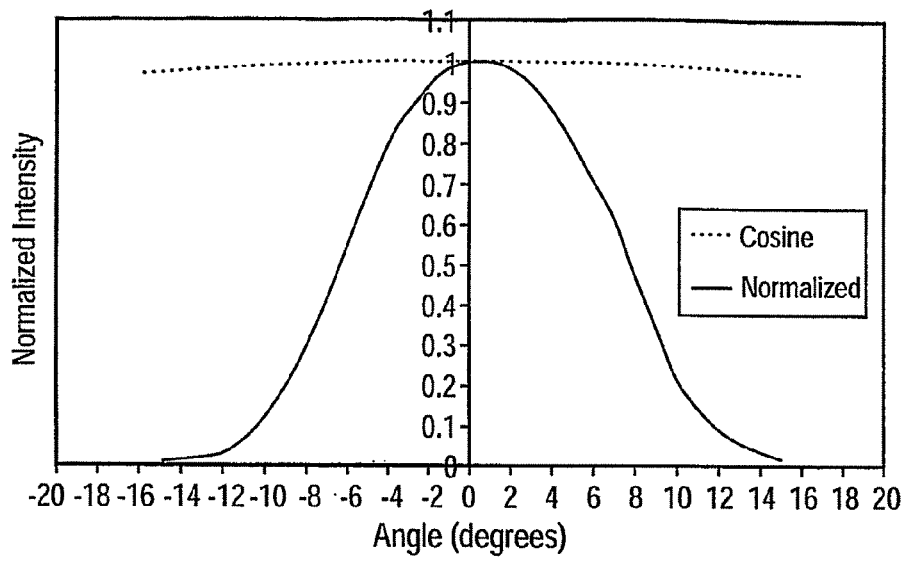
FIG. 2 illustrates the response of an optical radiation sensor device such as the one in FIG. 1 to ultraviolet radiation of constant intensity as a function of sensor angle to the radiation source.

When the first aperture is chosen to have the diameter of 0.075 in. and the second aperture is chosen to have a diameter of 0.125 in. The spacing between the sensing element and the first aperture was 0.110 in. whereas the spacing between the first aperture and the second aperture was 0.232 in. This yields a field of view of 10.5°. The angular response data of the sensor device is shown in FIG. 2. Thus, as the radiation source comes into the field of view of the sensor, the normalized intensity rises to the maximum value near 0° then decreases as the radiation source leaves the field of view. The angular reach with a so-called "cosine response" is relatively narrow—i.e., ±1°. Unfortunately, this means that the detected intensity of ultraviolet radiation will quickly decrease if the alignment of the sensor device is outside the limits of ±1°.

As stated above, the present optical radiation sensor device mitigates or obviates the problems associated with using circular-shaped attenuating apertures in the design of the sensor device. This is achieved by using, for example, a non-circular (e.g., square, rectangular, etc.) shaped radiation transparent opening or aperture. In other words, the radiation window is of a design such that the area of the radiation source (e.g., elongate lamp) "seen" by the radiation sensor device remains substantially unchanged as the radiation window is swept by the radiation source (e.g., elongate lamp) in a dynamic sensor system.

Figure 3:
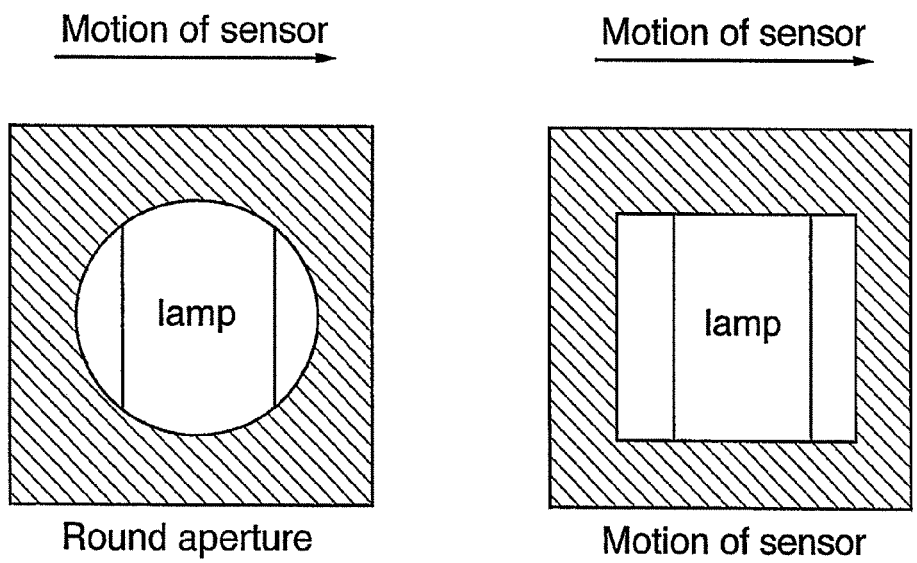
FIG. 3 illustrates the field of view of a sensor with attenuation apertures of different shape (circular and square)

This can be seen with reference to FIG. 3. Specifically, when a circular-shaped attenuating aperture is used in the sensor device, the area of the lamp in the field of view (i.e., within the area of the circular aperture) of the sensor is constantly changing from when the lamp first enters the field of view to when the lamp leaves the field of view—i.e., regardless of whether the lamp is wholly or partially within the field of view of the sensor device. In contrast, when a square aperture is used, once the lamp is wholly within the field of view (i.e., within the area of the square aperture), the area of the lamp in the field of view is unchanged until the lamp starts to leave the field of view.

The intensity of radiation sensed will be in proportion to the area of the lamp in the field of view of the sensor. In the result, the intensity of the radiation when a circular-shaped attenuating aperture is used will be constantly changing whereas that seen for the square-shaped attenuating aperture (a preferred embodiment of the present invention) will result in a substantially constant intensity reading once both sides of the lamp are within the field of view.

Figure 4:
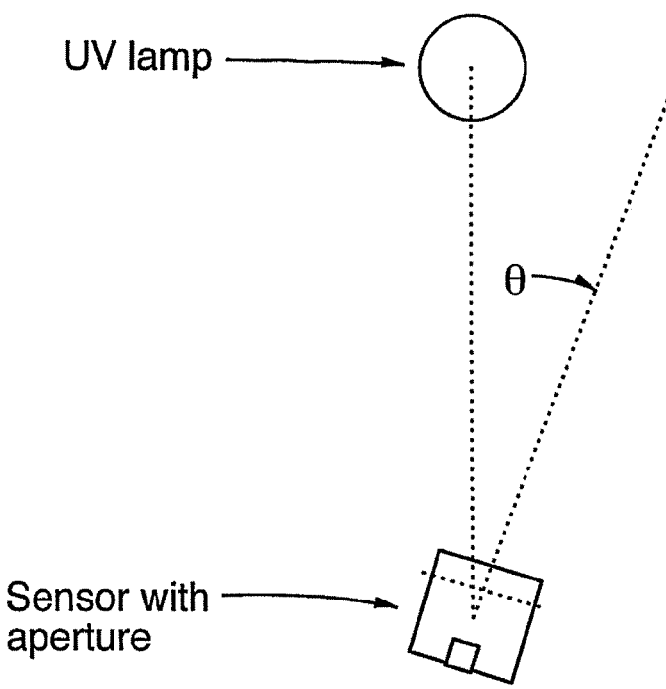
FIG. 4 illustrates a schematic view of a sensor with attenuating apertures relative to a radiation source.

With the square-shaped attenuating aperture preferred embodiment of the present optical radiation sensor device, the change of intensity will occur (typically a reduction) when the sensing device is tilted away from the radiation source and varies as the cosine of the angle of the sensor relative to the lamp by prescribed angle ($\theta$) as shown in FIG. 4.

Thus, a particularly preferred form of the present optical radiation sensor device is to utilize square-shaped or rectangular-shaped attenuating apertures (other shapes are also possible) in place of the conventional circular-shaped attenuating apertures used in the prior art approach discussed above with reference to FIGS. 1-2. Of course, those of skill in the art, will recognize that the particular shape of the attenuating aperture is not restricted provided that when the lamp is fully contained in the field of view, the surface area of the lamp in the field of view is substantially unchanged for at least two location points at which the radiation intensity may be determined.

Figure 5A:
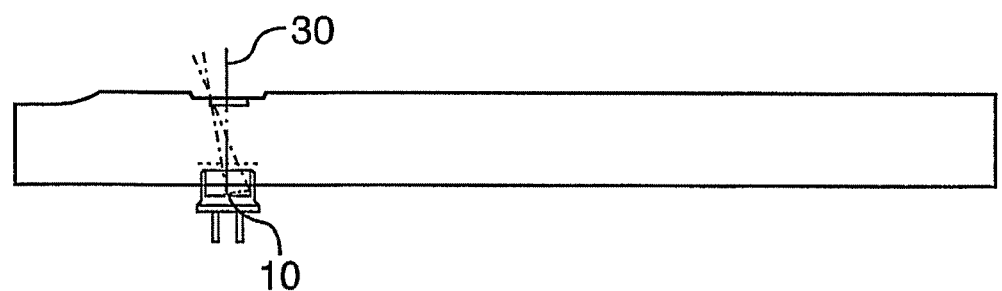
FIGS. 5a, 5b and 5c illustrate a schematic exterior view of a sensor device in accordance with the present invention.
Figure 5B:
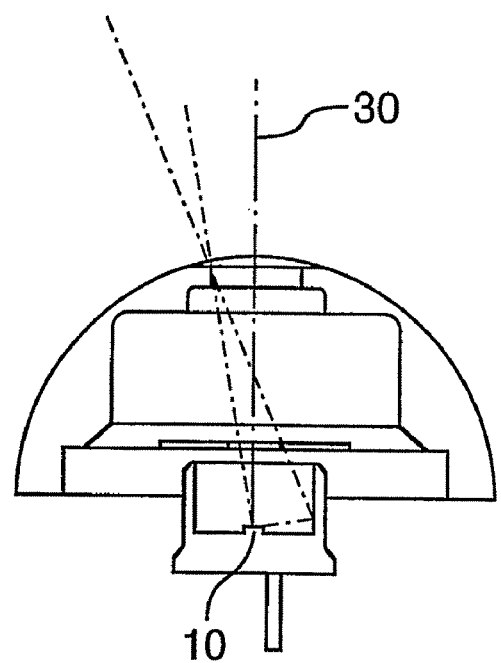
Figure 5C:
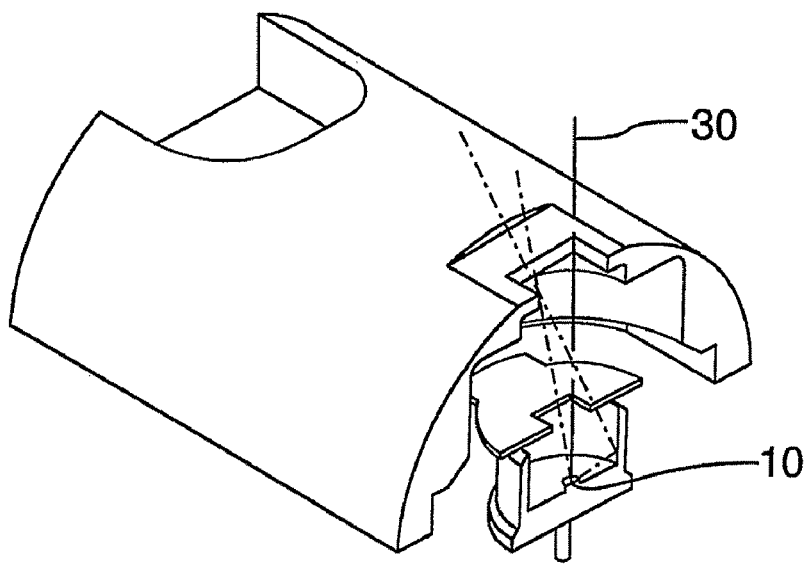

In a preferred example, the sensor device of FIG. 1 was modified to use a square-shaped attenuating aperture such that the first aperture was a 0.075 in.×0.075 in. square and the second aperture was a 0.125 in.×0.125 in. square. The relative spacing between the first aperture, the second aperture and the sensing element was not changed from that of FIGS. 1a and 1b discussed above. This also yields a field of view of 10.5°. A schematic view of such a sensor device is shown in FIGS. 5a, 5b and 5c. In FIGS. 5a, 5b and 5c, the same reference numerals in FIGS. 1a and 1b are used to denote like elements in FIGS. 5a, 5b and 5c. The principal difference in FIGS. 5, 5b and 5c is that the first aperture and second aperture are both square-shaped.

Figure 6:
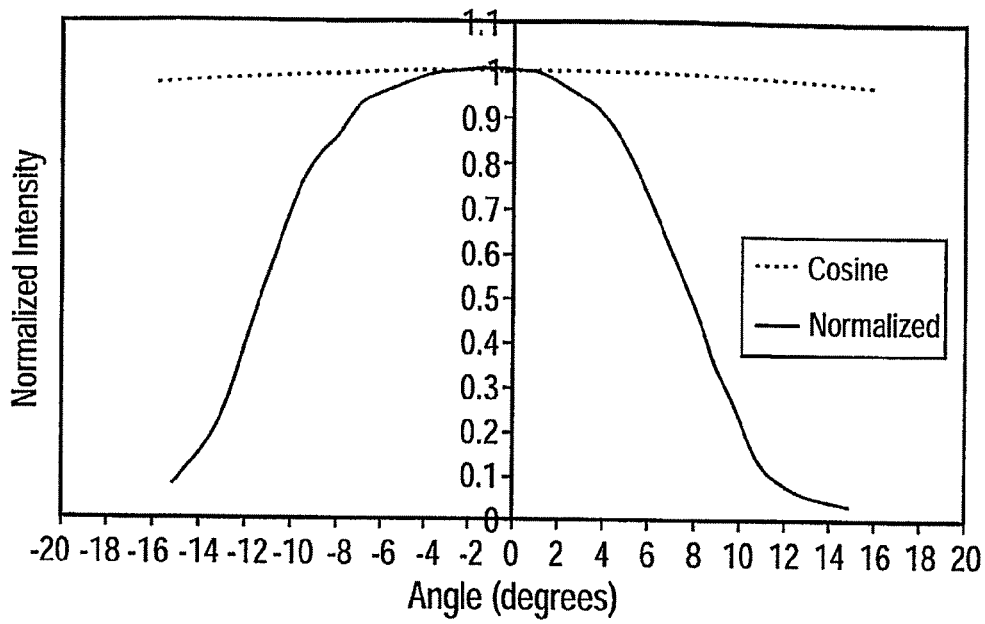
FIGS. 6-7 illustrate the response of an optical radiation sensor device such as the one in FIGS. 5a, 5b, and 5c to ultraviolet radiation of constant intensity as a function of sensor angle to the radiation source.

With reference to FIG. 6, there is shown the angular response data using the optical radiation sensor device illustrated in FIG. 5. For this optical radiation sensor device, the angular range with a cosine response is ±2.5°—i.e., a significant increase over the angular range seen using the optical radiation sensor device of FIG. 1 notwithstanding the fact that the field of view in both devices is the same. Visually, it can be seen that the angular response data for the optical radiation sensor device of FIG. 5 has a somewhat "flatter top" (FIG. 6) as compared to the data shown in FIG. 2 obtained using the conventional optical radiation sensor device of FIG. 1. As a result, there is a 5° range over which the detection error of measured intensity is low—for example, as a result of misalignment of the sensor device. Also, since the signal drops to <5% of the peak value at relatively wide angles, the use of such a non-circular (e.g., square) aperture suppresses stray reflections within the body of the sensor device.

Thus, an advantage of the present optical radiation sensor device is the ability to maintain the intensity of radiation in the form of a cosine response while the radiation source is entirely contained within the field of view of the sensor. Thus, the dimensions of the attenuating aperture (or apertures if multiple such apertures are used) can be changed to change the angular field of view of the sensor device.

Figure 7:
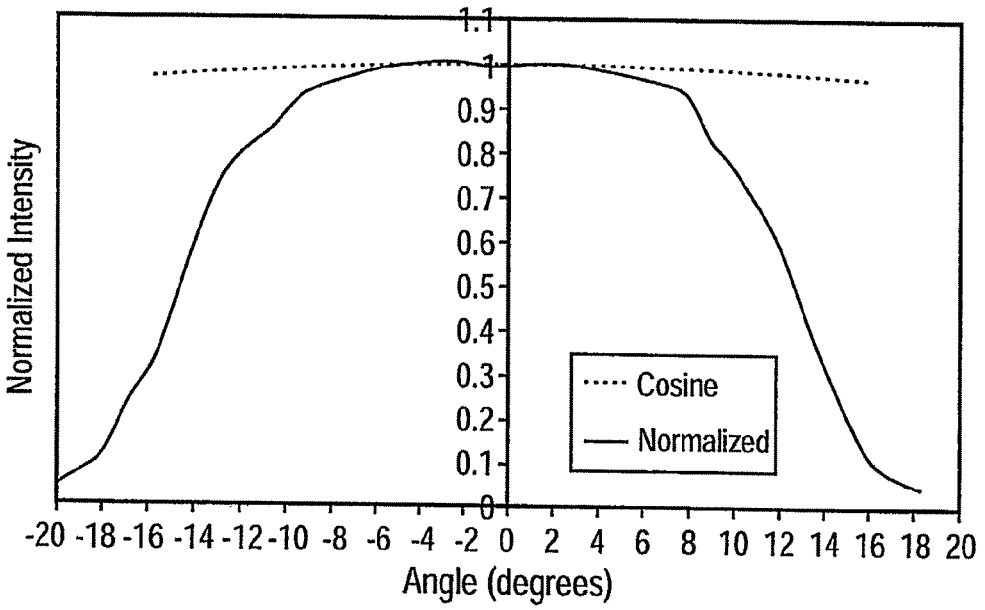

For example, the dimensions of the first aperture and the second aperture discussed above in accordance with FIGS. 5a, 5b and 5c can be changed to 0.090 in.×0.090 in. and 0.150 in.×0.150 in., respectively, to provide a field of view of ±13°. This would have the effect of widening the "flat top region" of the angular response data—this is confirmed by reviewing the data shown in FIG. 7. The resulting optical radiation sensor device can "see" a wider field of view and the region with the cosine response has now been increased to ±4°.

It should be noted that the sensing element used in the present optical radiation sensor device can be a semiconductor sensing element suitable for detecting, for example, ultraviolet radiation from lamps producing such radiation. For example, the sensing element can be made of silicon carbide or silicon sensing elements conventionally used in optical radiation sensor devices. The optical radiation sensor device can also be equipped with one or more filters to limit the wavelength response of the sensors. See, for example, U.S. patent application Ser. No. 60/506,144 filed Sep. 29, 2003.

The present optical radiation sensor device may be used for on-line determination of ultraviolet transmittance of a fluid being treated in an ultraviolet lamp area. The details of conducting the on-line transmittance analysis may be found in Sasges referred to above.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. An optical radiation sensor device for detecting radiation in a radiation field, the device comprising:

a sensor element capable of detecting and responding to incident radiation from the radiation field; and a radiation window interposed between the sensor element and the radiation field, the radiation window comprising a non-circular shaped radiation transparent opening oriented substantially concentrically with respect to the sensor element;

wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of greater than ±1° with respect to the concentric axis.

2. The optical radiation sensor device defined in claim 1, wherein the radiation transparent opening is substantially in the shape of a polygon.

3. The optical radiation sensor device defined in claim 1, wherein the radiation transparent opening is substantially in the shape of a rectangle.

4. The optical radiation sensor device defined in claim 1, wherein the radiation transparent opening is substantially in the shape of a square.

5. The optical radiation sensor device defined in claim 1, wherein the sensor element comprises a semiconductor material.

6. The optical radiation sensor device defined in claim 1, wherein the sensor element comprises a siliconbased photodiode.

7. The optical radiation sensor device defined in claim 1, wherein the sensor element comprises a silicon carbide photodiode.

8. The optical radiation sensor device defined in claim 1, wherein the radiation window comprises a plurality of non-circular shaped radiation transparent openings.

9. The optical radiation sensor device defined in claim 8, wherein the plurality of non-circular shaped radiation transparent openings are aligned substantially concentrically with the sensor element.

10. The optical radiation sensor device defined in claim 8, wherein the openings have a different size.

11. The optical radiation sensor device defined in claim 1, wherein the first non-circular shaped radiation transparent opening is interposed between a second non-circular shaped radiation transparent opening and the sensor element.

12. The optical radiation sensor device defined in claim 11, wherein the first non-circular shaped radiation transparent opening, the second non-circular shaped radiation transparent opening and the sensor element are aligned substantially with respect to a concentric axis.

13. The optical radiation sensor device defined in claim 12, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of greater than ±1.5° with respect to the concentric axis.

14. The optical radiation sensor device defined in claim 12, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of in the range of from about ±1.5° to about ±5.0° with respect to the concentric axis.

15. The optical radiation sensor device defined in claim 12, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of in the range of from about ±1.5° to about ±4.0° with respect to the concentric axis.

16. An optical radiation sensor system for detecting radiation in a radiation field, the device comprising:

the optical radiation sensor device defined in claim 1, and motive means to move the radiation transparent opening from a first sensing position in which radiation from a first portion of the radiation field is incident on the radiation sensing element and a second sensing position in which radiation from a second portion of the radiation field is incident on the radiation sensing element.

17. An optical radiation sensor device for detecting radiation in a radiation field, the device comprising:

a sensor element capable of detecting and responding to incident radiation from the radiation field; and a radiation window interposed between the sensor element and the radiation field, the radiation window comprising a plurality of non-circular shaped radiation transparent openings arranged serially with respect to the sensor element;

wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of greater than ±1° with respect to the concentric axis.

18. The optical radiation sensor device defined in claim 17, wherein at least one radiation transparent opening is substantially in the shape of a polygon.

19. The optical radiation sensor device defined in claim 17, wherein at least one radiation transparent opening is substantially in the shape of a rectangle.

20. The optical radiation sensor device defined in claim 17, wherein at least one radiation transparent opening is substantially in the shape of a square.

21. The optical radiation sensor device defined in claim 17, wherein the openings have a different size.

22. The optical radiation sensor device defined in claim 17, wherein the plurality of non circular shaped radiation transparent openings are aligned substantially concentrically with the sensor element.

23. The optical radiation sensor device defined in claim 17, wherein the radiation window comprises a first non-circular shaped radiation transparent opening interposed between a second non-circular shaped radiation transparent opening and the sensor element.

24. The optical radiation sensor device defined in claim 23, wherein the first non-circular shaped radiation transparent opening, the second non-circular shaped radiation transparent opening and the sensor element are aligned substantially with respect to a concentric axis.

25. The optical radiation sensor device defined in claim 24, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of greater than ±1.5° with respect to the concentric axis.

26. The optical radiation sensor device defined in claim 24, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of in the range of from about ±1.5° to about ±5.0° with respect to the concentric axis.

27. The optical radiation sensor device defined in claim 24, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of in the range of from about ±1.5° to about ±4.0° with respect to the concentric axis.

28. An optical radiation sensor system for detecting radiation in a radiation field, the device comprising:
the optical radiation sensor device defined in claim 17; and
motive means to move the radiation transparent opening from a first sensing position in which radiation from a first portion of the radiation field is incident on the radiation sensing element and a second sensing position in which radiation from a second portion of the radiation field is incident on the radiation sensing element.

29. An optical radiation sensor device for detecting radiation in a radiation field, the device comprising:
a sensor element capable of detecting and responding to incident radiation from the radiation field; and
a radiation window interposed between the sensor element and the radiation field, the radiation window comprising a first non-circular shaped radiation transparent opening interposed between (i) a second non-circular shaped radiation transparent opening and (ii) the sensor element, the first non-circular shaped radiation transparent opening, the second non-circular shaped radiation transparent opening, and the sensor element being aligned substantially with respect to a concentric axis;
wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of greater than    with respect to the concentric axis.

30. The optical radiation sensor device defined in claim 29, wherein the radiation transparent opening is substantially in the shape of a polygon.

31. The optical radiation sensor device defined in claim 29, wherein the radiation transparent opening is substantially in the shape of a rectangle.

32. The optical radiation sensor device defined in claim 29, wherein the radiation transparent opening is substantially in the shape of a square.

33. The optical radiation sensor device defined in claim 29, wherein the sensor element comprises a semiconductor material.

34. The optical radiation sensor device defined in claim 29, wherein the sensor element comprises a silicon-based photodiode.

35. The optical radiation sensor device defined in claim 29, wherein the sensor element comprises a silicon carbide photodiode.

36. The optical radiation sensor device defined in claim 29, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of greater than ±1.5° with respect to the concentric axis.

37. The optical radiation sensor device defined in claim 29, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of in the range of from about ±1.5° to about ±5.0° with respect to the concentric axis.

38. The optical radiation sensor device defined in claim 29, wherein: (i) the relative spacing between the first non-circular shaped radiation transparent opening, the second non-circular shaped radiation transparent opening and the sensor element, and (ii) the relative dimension of the first non-circular shaped radiation transparent opening and the second non-circular shaped radiation transparent opening, are chosen to define a cosine response of in the range of from about ±1.5° to about ±4.0° with respect to the concentric axis.

39. An optical radiation sensor system for detecting radiation in a radiation field, the device comprising:
the optical radiation sensor device defined in claim 29; and
motive means to move the radiation transparent opening from a first sensing position in which radiation from a first portion of the radiation field is incident on the radiation sensing element and a second sensing position in which radiation from a second portion of the radiation field is incident on the radiation sensing element.

* * * * *